P. H. HAMILTON.
AUTOMATIC CONTROL FOR GAS WATER HEATERS.
APPLICATION FILED JULY 17, 1915.

1,306,812. Patented June 17, 1919.

Inventor
Paul H. Hamilton,
By A. D. Jackson
Attorney

UNITED STATES PATENT OFFICE.

PAUL H. HAMILTON, OF FORT WORTH, TEXAS, ASSIGNOR, BY MESNE ASSIGNMENTS, TO ESDA MANUFACTURING COMPANY, OF WILMINGTON, DELAWARE, A CORPORATION OF DELAWARE.

AUTOMATIC CONTROL FOR GAS WATER-HEATERS.

1,306,812.      Specification of Letters Patent.      Patented June 17, 1919.

Application filed July 17, 1915. Serial No. 40,438.

*To all whom it may concern:*

Be it known that I, PAUL H. HAMILTON, a citizen of the United States, residing at Fort Worth, in the county of Tarrant and State of Texas, have invented certain new and useful Improvements in Automatic Controls for Gas Water-Heaters, of which the following is a specification.

My invention relates to a gas control for instantaneous gas water heaters, and the object is to provide a simple device for use where water is furnished to heating coils for automatically and simultaneously turning on the gas for heating the water when the water is turned on and to provide a device which has no stuffing boxes or packing glands or springs which will impair the operation of the controlling device. Another object is to provide such device which will automatically cut off the supply of gas when the water is cut off and to utilize the water pressure to accomplish both of these objects and to provide a controlling device which can be used for operating valves in other fluid containing devices. Other objects and advantages will be fully explained in the following description and the invention will be more particularly pointed out in the claims.

Reference is had to the accompanying drawings which form a part of this application.

Figure 1:
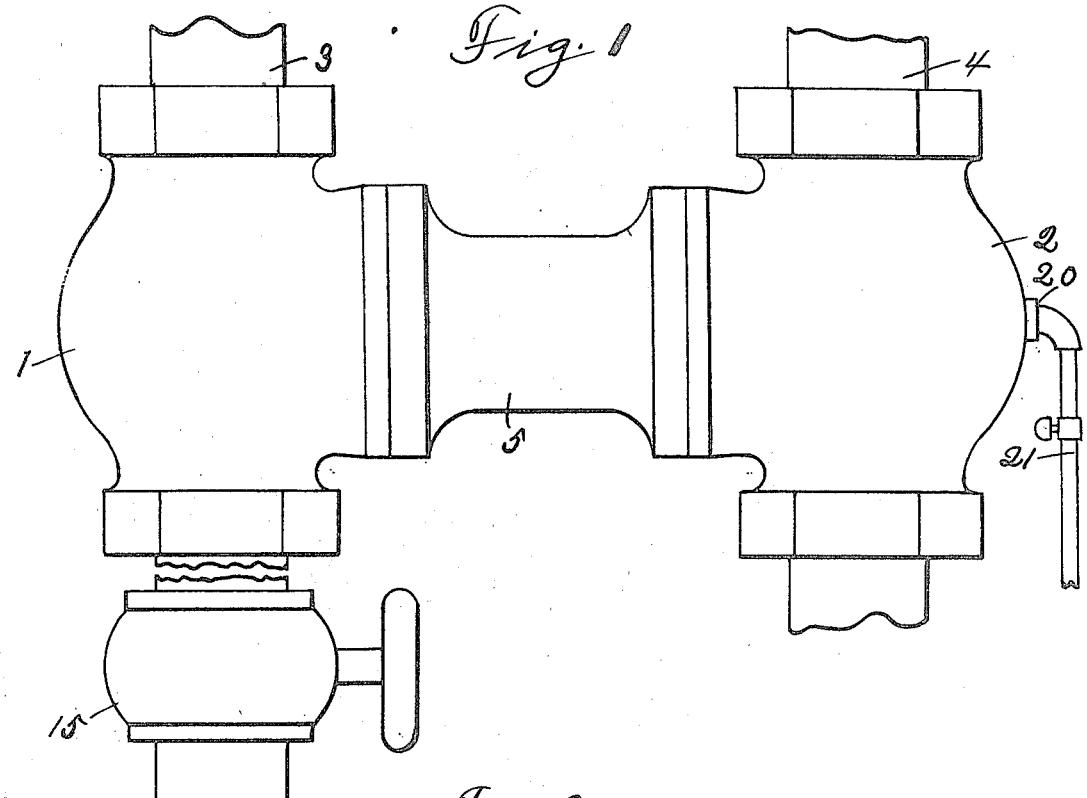
Figure 2:
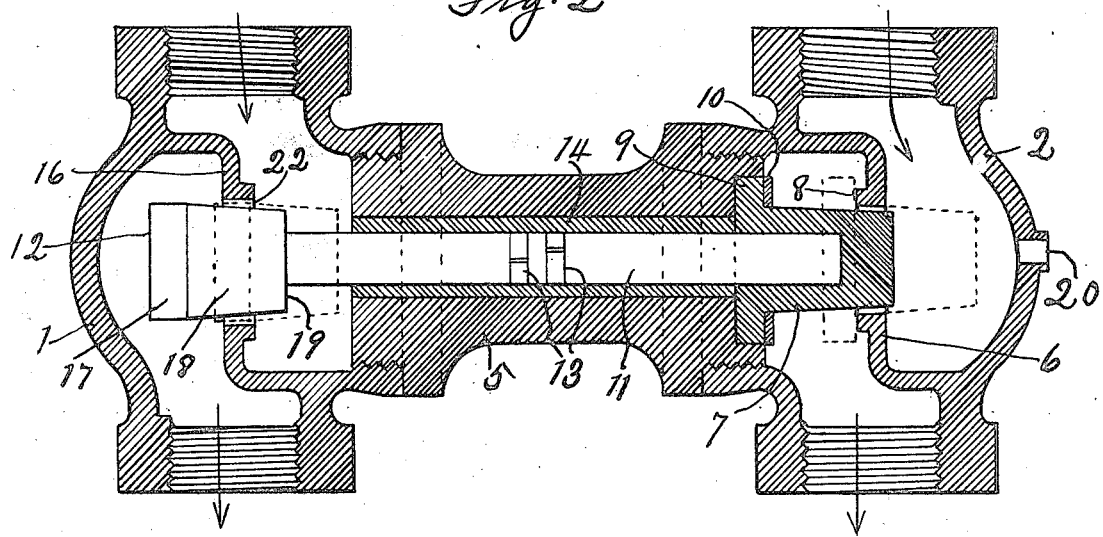

Figure 1 is a side elevation of the controlling devices. Fig. 2 is a longitudinal section of the same.

Similar characters of reference are used to indicate the same parts throughout the several views.

My invention is particularly designed for use in gas water heaters but it is apparent that the construction and arrangement can be used for other purposes. A casing 1 for the water controller and a casing 2 for the gas valve are provided. 3 indicates the water supply pipe and 4 indicates the gas inlet or supply pipe. The arrow heads indicate the direction of the fluids which pass through. The casings 1 and 2 are connected by a tubular coupling 5, the casings being screwed on the ends of the coupling. The gas casing 2 has a partition 6 through which the gas passes and in which is mounted a valve 7. A valve seat 8 is formed on one side. The valve 7 has an annular flange 9 and a gasket 10 is mounted on the valve and bears against the flange 9 and engages the seat 8 when the valve is closed. The valve 7 is carried by a plunger rod 11 which extends through the coupling 5 and is provided with a plunger controller 12 which may be formed integral therewith. The plunger rod 11 is provided with spring packing rings 13 and a bushing 14 is mounted on the rod 11 or rather in the coupling 5 and this bushing 14 may be made of hard rubber. The object of the bushing 14 is to permit the easy reciprocation of the plunger rod and to prevent leaking of fluids about the plunger rod 11, the bushing being stationary in the coupling 5. The coupling 5 has a seat in one end for the gas valve when the gas valve is open so that there can be no displacement of the gas valve which is loosely mounted on the rod 11. The outlet end of the water casing 1 is provided with a water cock 15. The water enters and passes out in the direction indicated by the arrow heads. The partition 16 has a passage for the controller 12 which is larger than the largest portion of the controller. The controller 12 has a cylindrical portion 17 and a conical portion 18 which reduces the inner end of the controller. The plunger rod 11 covers the central portion of the inner head 19 of the controller so that pressure surface on the end 19 is less than the pressure surface on the outer end 12 of the controller. The controller 12 and the valve 7 are drawn in the open positions and the dotted outlines indicate the closed positions. The valve casing 2 is provided with a pilot light connection 20 and a pipe 21 is connected therewith for delivering gas to a pilot light. The controller 12 is not large enough to close the opening 22 through the partition 16 so that when the controller is in the closed position, there will be pressure on both sides of or on both pressure surfaces 19 and 12. The pressure surface 12 is much greater than the surface 19 because the controller is tapering toward the surface 19 and the rod 11 takes up part of the surface that would be on the end 19.

Normally the controller 12 and the valve 7 will stand closed in the dotted outline positions. When the cock 15 is opened, the pressure on the surface 12 will be relieved. The pressure of the water on the surface 19 and on the tapering or conical surface 18 will instantly drive the controller to the open position. This will release the gas valve 7 and this valve will follow the plunger rod 11 to the open position and let the gas pass through the outlet end of casing 2. When the cock 15 is closed, the pressure of the water on surface 12 will be so much greater than the pressure on the surface 19 that the controller 12 and the valve 7 will be instantly closed, cutting off the flow of gas. The pressure of the water on the end 12 will hold the gas valve 7 closed. This is true because the water pressure does not cover the entire controller but covers the entire controller less the area equal to the cross-sectional area of the rod 11 and the cross-sectional area of the rod 11 has nothing pressing against it except the gas pressure which is so much less than the water pressure, the water pressure will hold the gas valve closed. The object in making the controller tapering, as at 18, is to present a variable pressure surface to the actuating fluid, whereby the proper position of the controller will be established to permit gas to pass in proportion to the water that is passing by the controller, the gas valve also being tapered.

What I claim, is,—

1. In a device of the class described in combination, a casing provided with an inlet and an outlet, a relatively thin partition between said inlet and outlet, said partition being provided with an opening comprising a portion of the passage from the inlet to the outlet, a movable controller plug extending through said opening and mounted to move in a line substantially parallel with axis of said opening, said controller plug comprising the frustum of a cone with the smaller end on the inlet side of the partition and the largest part of said plug being slightly less in diameter than the diameter of said opening, whereby said plug is at all times out of contact with the wall of said opening, and means for guiding said plug whereby the reduction of pressure on the outlet side enables said plug to move to a predetermined position where the forces acting on said plug are in balanced relation relative to said partition.

2. A casing provided with an inlet and an outlet, a relatively thin partition extending between said inlet and outlet and being provided with a cylindrical opening, a controller plug extending through said opening and out of contact therewith and having a portion of its surface conical, said controller plug being provided with a relatively small pressure area on the inlet side of said partition and a larger pressure area on the outlet side of said partition, and means for guiding said controller plug to enable said plug to have a movement substantially parallel to the axis of the said opening whereby when fluid is passing through said casing the controller plug assumes a position so that the pressure on the small area and the flow pressure against the conical portion of the plug within the opening balance the back pressure on the outlet area.

3. In combination, a casing provided with an outlet opening and an inlet opening, a restricted passageway between said inlet and outlet openings, the walls of said passageway being substantially cylindrical, a plug in the form of a frustum of a cone and mounted within and extending through said passageway and out of contact therewith with the smaller end of said frustum on the inlet side of said passage-way whereby the flow through the passage-way is against the conical wall of said plug, a relatively restricted pressure area on the smaller end of said frustum at the inlet end, and a larger pressure area upon the opposite end of said frustum at the outlet end, substantially as described.

4. In an automatic control of the character specified in combination a casing provided with an inlet and an outlet, a partition between said inlet and outlet, said partition being provided with an opening of a relatively short length, a conical member mounted for movement in said opening and at all times extending through said opening and out of contact with the side walls thereof, said member having a small area on the inlet side of said partition and a larger area on the outlet side of said partition whereby a flow of water through said opening tends to move said member until the pressures acting on said member are balanced.

5. In an automatic control of the character specified in combination, a casing provided with an inlet and an outlet, a relatively short restricted passageway between said inlet and outlet, means mounted for movement within said passageway and at all times out of contact therewith, said means having side portions inclined to the flow of water through said passageway in such manner as to vary the area of the passageway when said means is moved therein, said means tending to move through said passageway until the static pressures and flow pressure on said means are balanced relatively to said partition, and a gas valve operatively connected to said means.

6. In a device of the character specified in combination, a casing provided with an inlet opening and an outlet opening, a partition between said openings, said partition being provided with a relatively short cylindrical passageway, movable means of variable cross section mounted for movement in said passageway and adapted to vary the effective area of such passageway so that when water is flowing the inlet pressure acting on said means plus the flow pressure acting on said means equals the outlet pressure on said means, and a guide stem to maintain said means at all times out of contact with the walls of said passageway.

7. A proportional flow regulator comprising a partition provided with a passageway in the line of flow, a controller in said passageway and being provided with static pressure areas and a variable dynamic pressure area inclined toward the direction of flow, the static area on the inlet side of the partition being less than the static area on the outlet side of said partition, the effective dynamic area being dependent on the relation of said controller to said passageway and being variable to produce a condition of balance proportional to said flow when the effective inlet static pressure plus the effective dynamic pressure is equal to the effective outlet static pressure.

8. In a device of the character described, in combination, a casing provided with an inlet chamber and an outlet chamber, a wall separating said chambers and having a substantially cylindrical opening therein, a controller plug extending at all times through said opening and being of a length greater than said opening, the cross-sectional area of one end of said controller plug being greater than the cross-sectional area of the other end of said controller plug and smaller than the area of said opening so that communication is at all times maintained between said chambers, and the intermediate portion of said plug gradually increasing in cross-sectional area from the smallest cross-sectional area to the largest cross-sectional area so that when water is flowing through the said opening the plug tends to move to a balanced position.

9. In a device of the class described in combination, a casing provided with an inlet chamber and an outlet chamber separated by a relatively thin partition having an opening therethrough which connects the said chambers, a controller plug extending through said opening and being constructed in such manner that the effective static pressure areas thereon vary as said controller plug moves through the opening in the said partition, said controller plug being of such dimensions that the controller does not fit said opening water-tight, whereby pressure may build up from the inlet chamber into the outlet chamber when the water flow is stopped, and an operated member connected to said plug.

In testimony whereof, I set my hand this 6th day of July, 1915.

PAUL H. HAMILTON.